United States Patent [19]
Meyer et al.

[11] Patent Number: 5,999,360
[45] Date of Patent: Dec. 7, 1999

[54] DISC DRIVE SERVO SYSTEM EMPLOYING THERMAL SIGNALS

[75] Inventors: Dallas W. Meyer; Subrahmanyan Nagarajan, both of Burnsville, Minn.

[73] Assignee: Seagate Technology, Inc., Scotts Valley, Calif.

[21] Appl. No.: 08/793,327

[22] PCT Filed: Mar. 14, 1997

[86] PCT No.: PCT/US97/04072

§ 371 Date: Mar. 14, 1997

§ 102(e) Date: Mar. 14, 1997

[87] PCT Pub. No.: WO98/41981

PCT Pub. Date: Sep. 24, 1998

Related U.S. Application Data

[60] Provisional application No. 60/028,371, Oct. 15, 1996.

[51] Int. Cl.$^6$ .................................................. G11B 5/596
[52] U.S. Cl. ..................................... 360/77.02; 360/77.03
[58] Field of Search .................................. 360/75, 77.01, 360/77.02, 77.03, 77.05, 77.07, 77.08, 77.11, 78.11, 113, 135

[56] References Cited

U.S. PATENT DOCUMENTS

| | | | |
|---|---|---|---|
| 3,593,331 | 7/1971 | Connell | 340/174.1 |
| 4,802,050 | 1/1989 | Miyabayashi et al. | 360/135 |
| 5,021,910 | 6/1991 | Murakami | 360/123 |
| 5,210,672 | 5/1993 | Ivers et al. | 360/135 |
| 5,301,080 | 4/1994 | Ottesen et al. | 360/113 |
| 5,350,618 | 9/1994 | Togawa et al. | 428/156 |
| 5,367,409 | 11/1994 | Ottesen et al. | 360/46 |
| 5,394,277 | 2/1995 | Pahr et al. | 360/78.02 |
| 5,440,233 | 8/1995 | Hodgson et al. | 324/252 |
| 5,455,730 | 10/1995 | Dovek et al. | 360/113 |
| 5,457,585 | 10/1995 | Christensen | 360/75 |
| 5,483,394 | 1/1996 | Harman | 360/78.02 |
| 5,527,110 | 6/1996 | Abraham et al. | 374/5 |
| 5,568,327 | 10/1996 | Pahr et al. | 360/77.12 |
| 5,640,089 | 6/1997 | Horikawa et al. | 324/212 |
| 5,739,972 | 4/1998 | Smith et al. | 360/77.03 |

*Primary Examiner*—David L. Ometz
*Attorney, Agent, or Firm*—Kinney & Lange

[57] ABSTRACT

A magnetic disc drive has a magnetoresistive element (26) for reading user data from concentric tracks of a rotatable magnetic recording disc (32). The magnetoresistive element has a resistance based on a magnetic field derived from user data and based on temperature of the magnetoresistive element. Heat generated by the bias current through the head is in part dissipated through the disc, the amount of heat dissipated being representative of disc/head spacing. The surface of the recording disc has contour elements (50, 52, 54) arranged in a pattern representing servo data, the contour elements having a height such that the spacing between the magnetoresistive element and the contour elements is different from the spacing between the magnetoresistive element and a nominal surface of the recording disc. As a result, a modulated signal (66) from the head contains a component representative of user data and a component representative of servo data.

18 Claims, 4 Drawing Sheets

DISC DRIVE SERVO SYSTEM EMPLOYING THERMAL SIGNALS

CROSS REFERENCE TO RELATED APPLICATIONS

This application was filed under 35 U.S.C. 371 from PCT/US97/04072 filed Mar. 14, 1997 and claims priority of Provisional Application No. 60/028371 filed Oct. 15, 1996 by Dallas W. Meyer and Subrahmanyan Nagarajan for "Thermal Signal Used for Servoing a Disc Drive Actuator".

BACKGROUND OF THE INVENTION

This invention relates to servo systems for disc drives, and particularly to servo systems employing thermal signals.

Magnetoresistive (MR) heads operate on the principle that the resistance of a magnetoresistive element is at least in part based on the strength of the magnetic field from the data medium adjacent the head. A bias current through the MR element creates a voltage across the head, the magnitude of the voltage being based on the magnitude of the bias current and the resistance of the MR element. The varying voltage signal is representative of the data on the disc.

The resistance of the MR element is also dependent on a number of other factors, including temperature. Thus, the bias current also generates about 10 to 100 mW power in the form of heat within the element. The heat thermally dissipates into the head as well as across the interface into the recording disc. The amount of heat dissipated across the interface into the disc is a function of disc spacing between the disc and MR element. At small head/disc spacings (low flying heights), more heat is dissipated to the disc than when the spacing is large (high flying heights). Hence, the resistance of the MR element is a function of magnetic field strength, as well as thermal dissipation due to a function of disc/head spacing.

Typically, data are recorded on concentric tracks of magnetic discs, and the MR head is positioned over the selected track by an actuator. Servo data are used to control the actuator to accurately position the head over the selected track, and to maintain the head on the track. Usually, servo data are recorded either in the form of servo bursts in "spokes" on the same disc containing the user data (embedded servo systems) or on a separate disc maintained for the purpose of servo control (dedicated servo system). In both the dedicated and embedded servo systems, areas of the disc surface are dedicated to the recording of servo data, either on the same disc as user data or on the separate servo disc. The area dedicated to servo data may encompass a significant portion of the total area of the discs available for data of all classes. More particularly, in a dedicated servo system employing six discs (twelve disc surfaces) with one of the surfaces dedicated to the servo data, more than 8% of the total area of all disc surfaces is dedicated to servo data. In an embedded servo system, servo data may comprise 8 to 15% of the length of a track, and as much as 12% of the entire area of a disc. Because the servo data represents such a significant area of the disc, it is desirable to reduce that area without adversely affecting the operation of the disc drive.

Servo data are ordinarily recorded at significant lower frequencies than user data. For example, while user data may be in the MegaHertz range (e.g., 20 MHz and higher), servo data is ordinarily in the KiloHertz range (typically below about 20 KHz). While it would seemingly be possible to modulate the low frequency servo data with the high frequency user data on the magnetic disc, in fact it has not been practical. More particularly, data (both servo and user data) are recorded as transitions between magnetic states, the states generating magnetic fields of a single strength. The writing of magnetic states associated with the user data would overwrite the previously written magnetic states associated with the servo data, thereby rendering impossible recovery of servo data. Even if it were possible to preserve the transitions associated with the servo data, they would be indistinguishable from user data transitions, resulting in imprecise detection of the locations of transitions between magnetic states on the recording disc, thus leading to errors in user data recovery.

SUMMARY OF THE INVENTION

The present invention is directed to a servo system for a disc drive in which the servo data are recorded as contour elements arranged in a pattern along at least one of the concentric tracks and having a height from the surface of the disc so that the spacing between the magnetoresistive element and the contour elements is different from a nominal spacing of the magnetoresistive element and the surface of the recording disc. Variations in head/disc spacing caused by the undulating contour of the disc surface affects the thermal dissipation characteristics of the MR read head, thereby altering the resistance of the MR element in accordance with the pattern of the contour elements representing servo data. Simultaneously, the resistance of the MR element is altered due to changing magnetic field strength from user data recorded on the moving disc. These two changing conditions of the resistance of the MR element generate a modulated voltage signal across the MR element, one component representing user data and the other component representing servo data.

In particular, a servo system for a magnetic disc drive has a magnetoresistive element for confronting a surface of a rotatable magnetic recording disc. The recording disc has concentric tracks on which user data may be recorded in the form of transitions between magnetic states. The surface of the recording disc has contour elements arranged in a pattern along at least one of the concentric tracks, the contour elements having a height from the surface of the disc so that the spacing between the magnetoresistive element and the contour elements is different from a nominal spacing of the magnetoresistive element and the surface of the recording disc. The pattern of the contour elements is arranged to represent servo data at a servo frequency along the track. The resistance of the magnetoresistive element has a first component based on the magnetic state confronting the magnetoresistive element and a second component based on the temperature of the magnetoresistive element. A bias current through the magnetoresistive element provides a signal based on the resistance of the magnetoresistive element. A demodulator responds to the signal from the magnetoresistive element to provide a user data signal and a separate servo signal.

In alternative embodiments of the invention, the contour elements are bumps or pits extending above or into the nominal disc surface. In one preferred embodiment, the contour elements are formed as dipoles along the track length, each dipole having a bump and a pit. In other embodiments, the contour elements are centered along the track center, or are positioned between track.

DETAILED DESCRIPTION OF THE PREFERRED EMBODIMENTS

Figure 1:
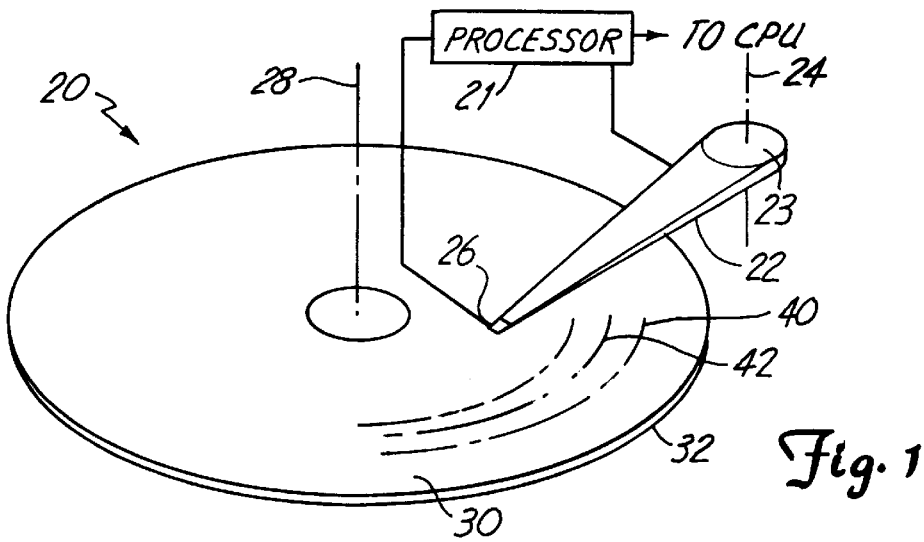
FIG. 1 is a diagram of a disc drive illustrating the physical relationship between the actuator arm, head and rotating disc.

As described above, several factors, including magnetic field strength and temperature, affect the electrical resistance of a given MR element. More particularly, the resistance of the MR element tends to decrease with increasing temperature, and hence is inversely proportional to temperature. Moreover, for an MR element flying a small distance from the surface of a magnetic disc, heat generated by the bias current in the MR element will dissipate into the head structure and its support, as well as across the disc/head space to the disc. The amount of heat dissipated to the disc is inversely proportional to the fly height of the MR head. Therefore, the resistance of the MR element due to temperature is directly proportional to the spacing of the MR element from the adjacent magnetic disc. More particularly, the resistance due to temperature can be expressed by the following equation:

$$R_1 = \frac{R_2 l_1 (1 + \beta l_2)}{l_2 (1 + \beta l_1)}$$

where $R_1$ is the resistance due to temperature of the MR element spaced distance $l_1$ from the disc, $R_2$ is the resistance due to temperature of the MR element spaced distance $l_2$ from the disc, and $\beta$ is a constant, and when the magnetic field on the MR element is zero or a constant. Based on experiments conducted on magnetoresistive heads, the resistance sensitivity due to head/disc spacing is typically between 200 and 1000 microvolts per microinch of spacing. This varies, of course, with the bias current and the physical configuration of the magnetoresistive head and its ability to diffuse heat internally and into the head structure. Moreover, the response time to changes in temperature within the magnetoresistive element is less than about $10^{-6}$ seconds, reflecting a frequency of greater than about 100 KHz. With servo frequencies of the order of about 5–20 KHz, the response time is adequate to support the servo frequency.

The present invention is directed to a servo system for a magnetic disc drive in which the concentric tracks on which user data are recorded includes regions of different thermal conductivity arranged in a pattern. First regions have a first thermal conductivity and the second regions having a second, different thermal conductivity. The pattern of the regions along the track represents servo data. The MR element is operated by a bias current which generates heat which in turn is dissipated in a known manner, based on flying characteristics of the head. As the head confronts the first and second regions, heat dissipation from the head changes in accordance with the pattern representing servo data. As a result, the signal recovered from the MR head includes a component at user data frequency representing user data and a component at servo data frequency representing servo data. Thereafter, a demodulator may separate user data from servo data.

The first and second regions are in the form of contour elements of different heights, wherein changes in the spacing between the magnetoresistive head and the contour elements causes changes in the thermal conductivity of the heat dissipation path through the disc. The contour elements may be in the form of dipoles represented by bumps and pits in a nominal surface of the disc, or may be in the form of bumps or pits alone in the nominal surface of the disc.

FIG. 1 illustrates a disc drive 20 having an actuator arm 22 arranged to be rotated about actuator arm axis 24 to move MR head 26 radially with respect to disc axis 28 across recording surface 30 of disc 32. The MR element is biased with a constant bias current in a manner well known in the art to produce a time-varying voltage across head 26 that varies in accordance with the resistance of the MR element. Data, recorded as transitions between magnetic states, is read by head 26 by rotating disc 32 at a design velocity so that the resistance of head 26 varies with changes in recorded magnetic states. A plurality of recording tracks 40, 42 are concentrically arranged on disc surface 30. That much of the disc drive illustrated in FIG. 1 is conventional, except that in the present invention disc surface 30 includes a pattern of contour elements, various embodiments of which are shown in greater detail in FIGS. 2, 3, 5, 6 and 8–12. The pattern of the contour elements provide servo signals and the contour elements are arranged at a servo frequency. As will be more fully described below, head 26 recovers user data at a user data frequency and recovers servo data at the servo frequency and provides the data to processor 21 which in turn processes the user data to a central processing unit and uses the servo data to operate actuator motor 23 to maintain the position of the actuator arm and head 26 adjacent the selected track.

Figure 2:
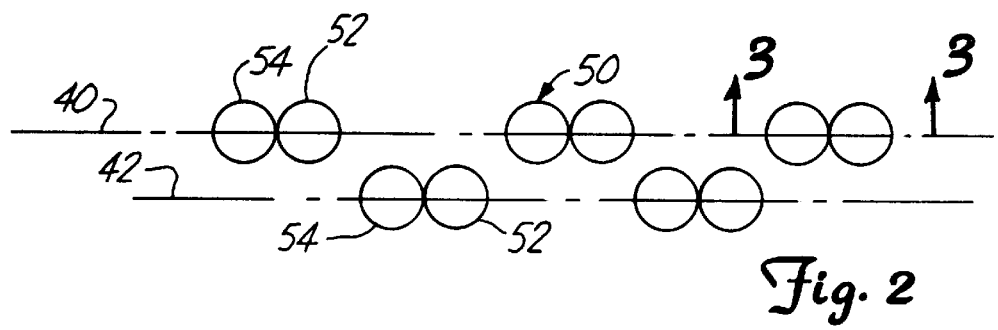
FIG. 2 is a plan view illustrating one embodiment of a patterned configuration on a disc for servo control in accordance with the present invention.
Figure 3:
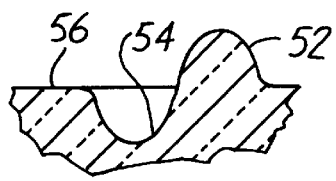
FIG. 3 is section view taken at line 3—3 in FIG. 2.

In accordance with the present invention, disc surface 30 includes a pattern of contour elements 50, the pattern being arranged so that the contour elements convey servo information at a prescribed servo frequency when the disc is rotated about disc axis 28 at a prescribed rotational velocity. FIGS. 2 and 3 illustrate one form of the contour elements comprising a dipole having a bump 52 and a pit 54. As shown particularly in FIG. 3, each bump 52 rises above a nominal surface 56 of disc surface 30 (toward the head flying above the disc surface) and each pit 54 forms a depression into nominal surface 56 (away from the head). In the embodiment illustrated in FIGS. 2 and 3, each of these dipole contour elements 50 are centered along the center of each track 40, 42 on the disc so that head 26 flying adjacent the track containing the contour elements first crosses a pit 54 and then a bump 52.

Figure 4A:
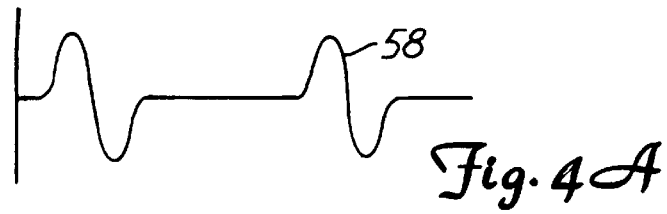
FIGS. 4A and 4B are waveforms illustrating the servo signal achieved with the embodiment illustrated in FIGS. 2 and 3.
Figure 4B:
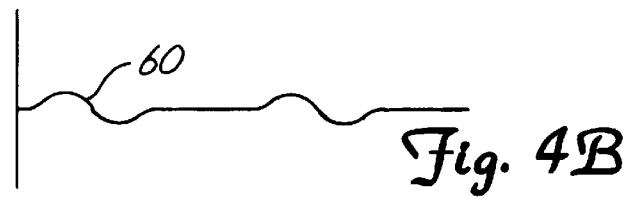

FIGS. 4A and 4B are waveforms illustrating the time-varying electrical resistance of the MR element of head 26 due to temperature as the head crosses contour elements 50. More particularly, the bias current through the MR element of head 26 generates heat which is in part dissipated along the path that includes the space between head 26 and the surface of disc 32 confronting the head. Since the bias current is constant, the quantity of heat generated by the MR head is also constant. The electrical resistance of the MR head is dependent, in part, on the temperature of the head, which in turn is proportional to the distance between the head and the disc. The electrical resistance of the MR head is inversely proportional to the temperature of the head, and thus inversely proportional to the distance between the head and the disc. The voltage across the head is directly proportional to the electrical resistance of the head. Hence, if head 26 is directly over track center, namely directly over center line of track 40, a relatively strong sinusoidal voltage signal 58 will be produced as a result of the change in distance between the head and the contour element comprising the pit 54 and the peak 52. Thus, the resistance within the MR element will significantly increase when confronting pit 54 and will significantly decrease when confronting bump 52. Conversely, if the head is off the center line 40 of the track, the resistance of the MR element will change less severely, producing the smaller signal 60 illustrated in FIG. 4B.

Figure 5:
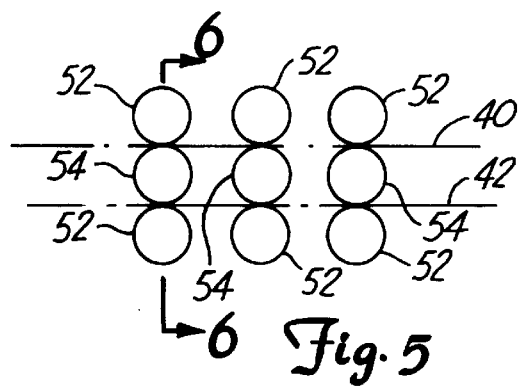
FIG. 5 is a plan view illustrating a second embodiment of a patterned configuration on a disc for servo control in accordance with the present invention.
Figure 6:
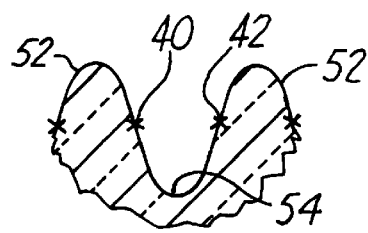
FIG. 6 is section view taken at line 6—6 in FIG. 5.

FIG. 5 illustrates a configuration of contour elements comprising individual bumps 52 and individual pits 54. In FIG. 5, the bumps 52 and pits 54 along each side of tracks 40, 42, with a concentric row of bumps 52 on one side of track center and a concentric row of pits 54 on the other side of track center. Hence, the bumps and pits are radially positioned such that a bump is radially between two pits and a pit is radially between two bumps, and so on. Moreover, the pits and bumps are positioned along the track length such that each pit or bump is offset from track center and the track centerline passes between radially aligned contiguous elements 52 and 54. Hence, each bump 52 and pit 54 has a size approximately equal to the track center line spacing between tracks and is positioned between successive radial tracks. As shown particularly in FIG. 6, the track centerlines 40, 42 are at the midpoint between the apex of a bump 52 and a pit 54.

If a magnetic head is positioned directly over the centerline of a track, heat dissipation between the MR element and the disc will vary across the width of the MR element (width of the track) based on whether a given edge confronts a bump or a pit. However, the average heat dissipation between the head and the disc will remain constant at all locations along the track. As a result, signals resulting from heat retained in the head will be constant, as shown by waveform 62 in FIG. 7A. On the other hand, if the head is off track center, heat will dissipate unequally at the bumps and pits, resulting in a series of signals, resembling half sinusoidal signals 64, as shown in FIG. 7B. More particularly, if the head is offset toward the row of pits 54 along one side of track center, a series of positive signals will result, as shown in FIG. 7B, the magnitude of which is representative of the amount of offset of the head from track center. On the other hand, if the head is offset toward the row of bumps 52 along the other side of track center, a series of negative signals will result whose magnitude represents the amount of offset of the head from track center.

Figure 8:
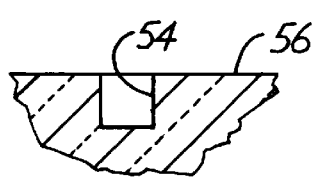
FIGS. 8 and 9 are section views illustrating additional embodiments of a patterned configuration on a disc for servo control in accordance with the present invention.
Figure 9:
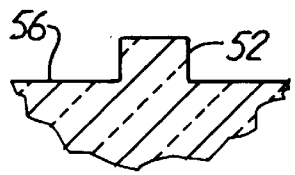

FIGS. 8 and 9 illustrate yet different configurations of a contour element in which the bumps 52 and pits 54 are cylindrical cavities into or posts rising from the nominal surface 56 of the disc.

Figure 10:
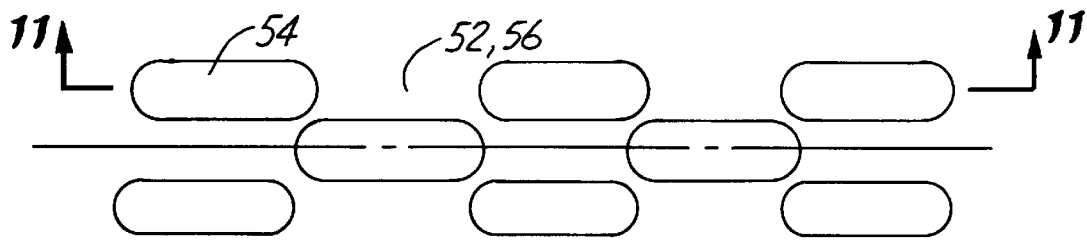
FIG. 10 is a plan view illustrating another embodiment of a patterned configuration on a disc for servo control in accordance with the present invention.
Figure 11:
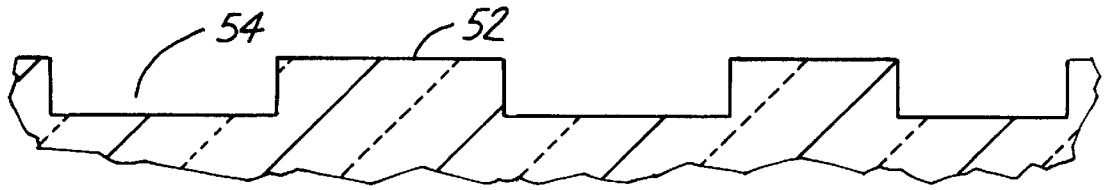
FIG. 11 is section view taken at line 11—11 in FIG. 10.

FIGS. 10 and 11 illustrate yet a different shape for the contour elements wherein the contour elements are elongated along the track length at the servo frequency so that each transition between a peak 52 and a pit 54 is at the servo frequency. In this case, the pits 54 are conveniently formed by laser machining or other suitable etching technique, leaving the bumps 52 at the nominal surface 56 of the disc.

Figure 12:
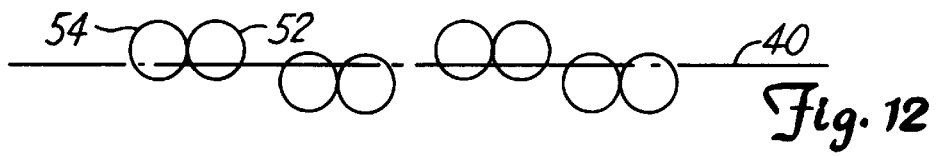
FIG. 12 is a plan view illustrating yet another embodiment of a patterned configuration on a disc for servo control in accordance with the present invention.

Although the servo contour elements have thus far been described as being arranged on or directly off track center, it is understood that the servo contour elements may also straddle the disc center. Thus, as illustrated in FIG. 12, the dipole elements, such as shown in greater detail in FIG. 2 and 3, are radially offset one-half track so that the track center line 40 intersects all of the dipole contour elements equally, midway between the center and an edge of each bump 52 or pit 54. It would be appreciated that a head that is directly on track center will read each of the dipole elements equally producing a balanced signal, similar to that illustrated in FIG. 4A, whereas a head that is off track center will read one set of contours (one dipole) more strongly than another (the next dipole), resulting in a series of signals, as in FIG. 4A, in which the signal strength is alternately high for a first dipole and low for the next.

Although the servo contour elements have thus far been described as a series of evenly spaced bumps and/or pits arranged at the servo frequency, it will be appreciated that the bumps and/or pits may be arranged to convey yet additional information, such as sector, track (cylinder), and disc (head) identification. Further, the bumps and pits may be selectively arranged to convey the information. As already described, the contour elements are arranged to provide track position error information for track centering purposes. In any case, the contour elements are arranged so that when the disc is rotated at its predetermined or design rotational velocity, the information contained in the contour elements is recovered at the design servo frequency, different from user data frequency.

Figure 7A:
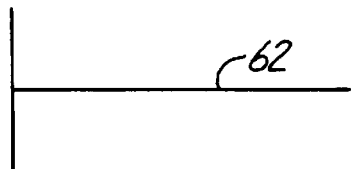
FIGS. 7A and 7B are waveforms illustrating the servo signal achieved with the embodiment illustrated in FIGS. 5 and 6.
Figure 7B:
Figure 14:
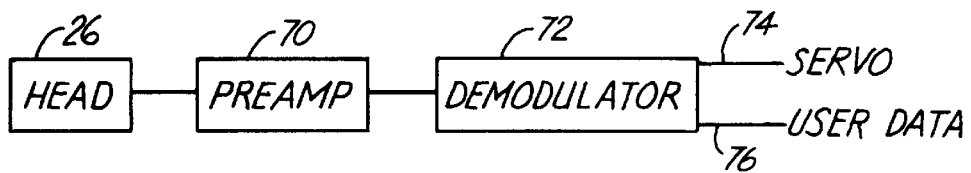
FIG. 14 is a block circuit diagram illustrating a circuit for recovering servo data and user data from a disc using the servo techniques of the present invention.
Figure 13B:
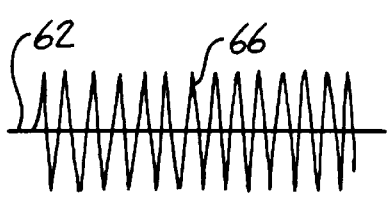
FIGS. 13A and 13B are waveforms illustrating the recovered modulated signal using the present invention.
Figure 13A:
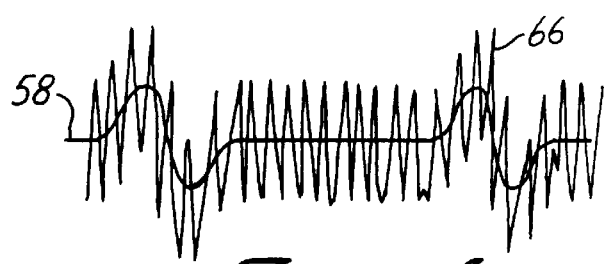

The magnetic head reading the disc having contour elements as herein described produces a signal represented in FIGS. 4 or 7, comprising low frequency servo data frequency modulated with the high frequency user data, as shown in FIG. 13A and 13B (which illustrate user data signal 66 modulated with the on-track servo signals of FIGS. 4A and 7A, respectively). As illustrated in FIG. 14, the signal thus produced from the head is amplified by preamplifier 70 and separated by demodulator 72. The user data is recovered at significantly higher frequencies (20–100 MHz) than servo data (5–20 KHz). Demodulator 72 demodulates the signal from preamplifier 70 to separate the low frequency servo data to output 74 from the higher frequency user data to output 76 for processing in a manner well-known in the art.

Although the contour elements cause changes in the spacing between the recording surface of the magnetic disc and the read head, resulting in changes of the distance between the recorded magnetic information on the disc and the read head confronting the disc, the peak-to-peak value of the data signals only slightly varies as a result of the changes of spacing. Hence, amplitude modulation of the magnetic signal is negligible. The signals produced as a result of changes in disc/head spacing of the contour elements appear more as shown in FIG. 13A with the peak-to-peak values of signal 66 remaining reasonably constant, with the DC center value varying in accordance with servo information as shown at signal 58. Hence, equalization of the data signal for changes in disc/head spacing is unnecessary.

Figure 15A:
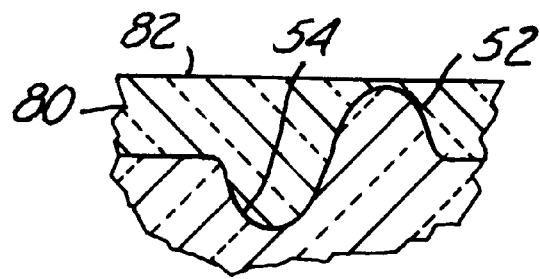
FIGS. 15A, 15B and 15C are section views, as in FIGS. 3, 8 and 9, illustrating additional embodiments of a patterned configuration on a disc for servo control in accordance with the present invention.
Figure 15B:
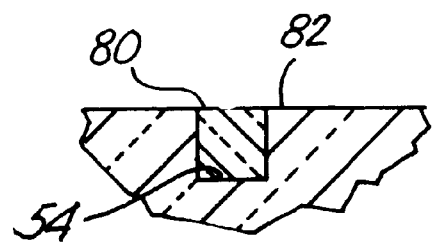
Figure 15C:
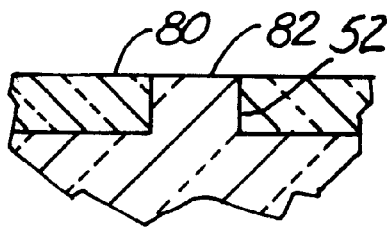

The bumps and pits forming the contour elements are formed of the high thermal conductivity magnetic material forming the disc. Heat reaching the disc is dissipated through the high thermally conductive material. However, the different spacings of the contour elements from the magnetoresistive element also provide thermal dissipation paths of different thermal conductivity, due to the different air gap between the different contour elements on the disc and the magnetoresistive element. The thermal dissipation path formed between the disc and the head is in parallel with the thermal dissipation path from the head to the head support and the air surrounding the head. Hence, the amount of heat dissipated from the head depends, in part, on the thermal conductivity of the dissipation path through the disc, which in turn depends on the contour elements on the disc. However, the bumps and pits forming the contour elements also provide a rough surface over which the air-bearing surfaces of the head and slider to which the head is mounted must fly. In some cases the disc surface should be smooth, to more precisely control the flying characteristics of the head and slider. FIGS. 15A, 15B and 15C illustrate contour elements 52 and 54, as in FIGS. 3, 8 and 9 having a layer 80 of low thermally conductive (high thermal insulation) material over at least the pits 54 and preferably also over the nominal surface 56 of the disc. Surface 82 of layer 80, together with the tops of bumps 52 (if not encapsulated in layer 80) or the nominal surface (where only pits 54 are used), forms a smooth surface to the disc confronting the air-bearing surface of the confronting head and slider. In any case, layer 80 encompasses the contour elements, by filling the pits and/or embracing the bumps.

Although the present invention has been described with reference to preferred embodiments, workers skilled in the art will recognize that changes may be made in form and detail without departing from the spirit and scope of the invention.

We claim:

1. A servo system for a magnetic disc drive having a magnetoresistive element for confronting a surface of a rotatable magnetic recording disc, the recording disc having concentric tracks on which user data may be recorded at a user data frequency, the magnetoresistive element having a resistance based on a magnetic field derived from the user data on the recording disc and based on temperature of the magnetoresistive element, and a bias current through the magnetoresistive element operates to provide a signal based on the resistance of the magnetoresistive element, the servo system being characterized by
   a recording surface of the recording disc having a plurality of bumps and pits formed as dipoles along a length of at least one of the concentric tracks and arranged in a pattern representing servo data along the length of the at least one of the concentric tracks, the bumps extending above a nominal level of the recording surface and the pits extending into the nominal level of the recording surface so that a distance between the magnetoresistive element and a confronting bump is smaller than a distance between the magnetoresistive element and a confronting pit so that the bumps have a first thermal conductivity with the magnetoresistive element and the pits have a second thermal conductivity with the magnetoresistive element different from the first thermal conductivity such that the dipoles maintain thermal equilibrium with the magnetoresistive element to the nominal level of the recording surface; and
   a demodulator responsive to the signal based on resistance for providing a user data signal and a separate servo signal.

2. The servo system of claim 1, wherein the user data is recorded at the user data frequency and the pattern of the dipoles along the at least one of the concentric tracks has a servo frequency, the servo frequency being different from the user data frequency.

3. The servo system of claim 1, including a material forming a planar surface on the disc and encompassing the plurality of bumps and pits, the material forming the planar surface having a thermal conductivity different from a magnetic material forming the disc.

4. The servo system of claim 3, wherein the dipoles are centered along the at least one of the concentric tracks.

5. The servo system of claim 3, wherein the dipoles are positioned between the concentric tracks.

6. The servo system of claim 1, wherein the user data is recorded as transitions between magnetic states, the magnetic states being arranged to alter the resistance of the magnetoresistive element when the recording disc transports the transitions past the magnetoresistive element.

7. The servo system of claim 1, wherein the dipoles are positioned between the concentric tracks with the bumps arranged along one side of the center of the at least one of the concentric tracks and the pits arranged along the opposite side of the center of the at least one of the concentric tracks.

8. The servo system of claim 1, wherein the dipoles are arranged along the length of the at least one of the concentric tracks so that the bump and the pit of each of the dipoles are positioned sequentially along the at least one of the concentric tracks.

9. A magnetic disc drive having a rotatable disc for recording magnetic orientations along concentric tracks, and a magnetoresistive element for reading the magnetic orientations in a respective track confronting the magnetoresistive element as the disc is rotated and a predetermined bias current is applied to the magnetoresistive element, the magnetic orientations representing user data, the user data having a predetermined user data frequency when the disc is rotated at a predetermined rotational velocity, the improvement comprising
   a plurality of bumps and pits formed as dipoles along a length of at least one track on a recording surface of the disc confronting the magnetoresistive element, the bumps extending above a nominal level of the recording surface and the pits extending into the nominal level of the recording surface so that a distance between the magnetoresistive element and a confronting bump is smaller than a distance between the magnetoresistive element and a confronting pit so that the bumps have a first thermal conductivity with the magnetoresistive element and the pits have a second thermal conductivity with the magnetoresistive element different from the first thermal conductivity, the dipoles being arranged in a pattern along the at least one track such that the dipoles maintain thermal equilibrium with the magnetoresistive element to the nominal level of the recording surface, the pattern representing servo data having a predetermined servo frequency different from the user data frequency when the disc is rotated at the predetermined rotational velocity.

10. The apparatus of claim 9, wherein the dipoles are centered along the at least one track.

11. The apparatus of claim 9, wherein the dipoles are positioned between the concentric tracks.

12. The apparatus of claim 11, wherein the bumps are arranged along one side of the center of the at least one track and the pits are arranged along the opposite side of the center of the at least one track.

13. The apparatus of claim 9, wherein the dipoles are arranged along the length of the at least one track so that the bump and the pit of each of the dipoles are positioned sequentially along the at least one track.

14. A recording disc for use in a magnetic disc drive for recording magnetic orientations as user data along concentric tracks on the disc, the disc drive having a magnetoresistive element for reading the magnetic orientations in a respective track confronting the magnetoresistive element as the disc is rotated and a predetermined bias current is applied to the magnetoresistive element, the disc having a recording surface having a plurality of bumps and pits formed as dipoles along a length of at least one track and arranged in a pattern along the at least one track, the bumps extending above a nominal level of the recording surface and the pits extending into the nominal level of the recording surface so that a distance between the magnetoresistive element and a confronting bump is smaller than a distance between the magnetoresistive element and a confronting pit so that the bumps have a first thermal conductivity with the magnetoresistive element and the pits have a second thermal conductivity with the magnetoresistive element different from the first thermal conductivity such that the dipoles maintain thermal equilibrium with the magnetoresistive element to the nominal level of the recording surface, the pattern representing servo data having a predetermined servo frequency when the disc is rotated at a predetermined rotational velocity.

15. The recording disc of claim 14, wherein the dipoles are centered along the at least one track.

16. The recording disc of claim 14, wherein the dipoles are positioned between the concentric tracks.

17. The recording disc of claim 16, wherein the bumps are arranged along one side of the center of the at least one track and the pits are arranged along the opposite side of the center of the at least one track.

18. The recording disc of claim 14, wherein the dipoles are arranged along the length of the at least one track so that the bump and the pit of each of the dipoles are positioned sequentially along the at least one track.

* * * * *